(12) United States Patent
Cox

(10) Patent No.: US 9,574,400 B2
(45) Date of Patent: Feb. 21, 2017

(54) VEHICLE HITCH LADDER SUPPORT DEVICE

(71) Applicant: Raymond Cox, Blackshear, GA (US)

(72) Inventor: Raymond Cox, Blackshear, GA (US)

(*) Notice: Subject to any disclaimer, the term of this patent is extended or adjusted under 35 U.S.C. 154(b) by 0 days.

(21) Appl. No.: 14/577,498

(22) Filed: Dec. 19, 2014

(65) Prior Publication Data

US 2015/0191975 A1 Jul. 9, 2015

Related U.S. Application Data

(60) Provisional application No. 61/923,356, filed on Jan. 3, 2014.

(51) Int. Cl.
| | |
|---|---|
| *E06C 5/24* | (2006.01) |
| *E06C 7/42* | (2006.01) |
| *B60D 1/58* | (2006.01) |
| *B60D 1/66* | (2006.01) |
| *E06C 1/12* | (2006.01) |
| *E06C 5/04* | (2006.01) |

(52) U.S. Cl.
CPC . *E06C 5/24* (2013.01); *B60D 1/58* (2013.01); *B60D 1/66* (2013.01); *E06C 7/426* (2013.01); *E06C 1/12* (2013.01); *E06C 5/04* (2013.01)

(58) Field of Classification Search
CPC ............... E06C 5/24; E06C 7/426; E06D 1/24
USPC ....................... 280/491.1; 182/127, 107, 111
See application file for complete search history.

(56) References Cited

U.S. PATENT DOCUMENTS

| | | | | |
|---|---|---|---|---|
| 4,618,029 A * | 10/1986 | Lowry | ...................... | E04G 1/28 182/116 |
| 4,798,262 A * | 1/1989 | Margolies | ................. | E06C 1/20 182/106 |
| 4,875,547 A * | 10/1989 | Hanthorn | .................. | B66B 9/16 182/102 |
| 4,909,352 A * | 3/1990 | McComb | ................... | E06C 7/42 182/127 |
| 5,469,933 A * | 11/1995 | Thomason | ................ | E06C 5/02 182/127 |
| 6,250,425 B1 * | 6/2001 | Barnes | ....................... | E06C 5/02 182/127 |
| 6,357,548 B1 * | 3/2002 | Boyd | ..................... | B60R 9/0423 182/127 |
| 6,467,576 B2 * | 10/2002 | Figura | ........................ | E06C 5/04 182/2.5 |
| 7,168,521 B1 | 1/2007 | Murray | | |
| 7,740,106 B2 * | 6/2010 | Vetesnik | .................. | A62B 1/04 182/116 |

(Continued)

*Primary Examiner* — Anne Marie Boehler
*Assistant Examiner* — Marlon A Arce
(74) *Attorney, Agent, or Firm* — Global Intellectual Property Agency, LLC; Daniel Boudwin

(57) ABSTRACT

A ladder support device removably securable to the hitch receiver of a vehicle. The ladder support device comprises a frame having adjustable ground engaging legs. The frame includes a pivoting arm to be removably secured to the hitch of a vehicle to allow the frame to be positioned in a desired orientation relative to the vehicle. The frame includes a pair of brackets for receiving the feet of an extension ladder therein. Further, the frame comprises a pair of telescopic support arms that extend upward from the frame and that can be secured to a portion of the extension ladder so as to secure the ladder in an upright, angled orientation without having to rest the ladder against a support surface, such as the side of a building.

19 Claims, 3 Drawing Sheets

(56) References Cited

U.S. PATENT DOCUMENTS

| | | | | |
|---|---|---|---|---|
| 7,828,116 B2* | 11/2010 | Vetesnik | ............... | A62B 1/04 182/115 |
| 8,047,331 B2* | 11/2011 | Spicer | ............... | E06C 5/02 182/127 |
| 8,251,177 B2* | 8/2012 | Watt | ............... | B66F 11/04 182/141 |
| 8,393,586 B1* | 3/2013 | Mercure | ............... | E06C 7/426 182/180.3 |
| 8,448,978 B2* | 5/2013 | Alvarino | ............... | B62D 63/061 280/638 |
| 8,500,102 B2* | 8/2013 | Scott | ............... | B60D 1/66 254/420 |
| 8,636,110 B2* | 1/2014 | Ebbenga | ............... | B60D 1/58 182/106 |
| 2011/0278093 A1 | 11/2011 | La Rock | | |
| 2012/0199416 A1 | 8/2012 | Hopkins et al. | | |

\* cited by examiner

VEHICLE HITCH LADDER SUPPORT DEVICE

CROSS REFERENCE TO RELATED APPLICATION

This application claims the benefit of U.S. Provisional Application No. 61/923,356 filed on Jan. 3, 2014. The above identified patent application is herein incorporated by reference in its entirety to provide continuity of disclosure.

BACKGROUND OF THE INVENTION

Field of the Invention

The present invention relates to a ladder support device that is securable to the hitch receiver of a vehicle. The ladder support device comprises a frame that is removably securable to a vehicle hitch, and that includes brackets on which the feet of a ladder can be positioned. The device further includes a pair of adjustable support arms that can be connected to the ladder in order to support the same in an upright, angled orientation.

Extension ladders are often used by various workers including contractors, painters, construction workers, and electricians, among others. Extension ladders allow the worker to adjust the ladder to the desired height required to reach an elevated area, such as the upper floor of a house or other building. Extension ladders can reach higher elevations than conventional ladders and can be retracted so that they are compact for storage.

Extension ladders are generally supported by leaning the ladder against a support surface, such as the side of a building. However, a support surface is not always available in an area where a worker may want to use an extension ladder. Using the extension ladder without a support surface is highly dangerous and creates a risk that the worker will fall from the ladder and injure himself or herself, or that the ladder itself will tip over. Thus, a device that is adapted to support an extension ladder that is securable to a vehicle hitch is provided.

Description of the Prior Art

Devices have been disclosed in the prior art that relate to ladder support devices. These include devices that have been patented and published in patent application publications. These devices generally relate to ladder support devices securable to the hitch of a vehicle, such as a pick-up truck. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 8,393,586 to Mercure discloses a ladder support mountable to a vehicle hitch. The device includes a hitch tube to be inserted into the hitch receiver of a vehicle. A pair of side plates is connected to the hitch tube, wherein the side plates include a pivot void and an upper void. The pivot void aligns with a hollow ladder rung of a ladder and the upper void aligns with the second hollow ladder rung. Rods can be inserted into the pivot voids and the upper voids and through the hollow ladder rungs to secure the ladder in position.

U.S. Pat. No. 6,357,548 to Boyd discloses a ladder support device attachable to the hitch of a vehicle. The device can be transported in a horizontal position above a vehicle, and can be folded down into a deployed position for use. The device includes brackets that limit the range of motion of a ladder positioned therein. The device further includes a platform on which the user can stand when he or she is mounting the ladder. The device is rotatable so that the ladder carried by the device can be rotated into a desired position. Thus, Boyd fails to disclose a ladder support device having a pair of elongated arms securable to a portion of a ladder to facilitate holding the ladder in an upright, angled position. Boyd limits the ladder to a substantially vertical position and has limited range of motion.

U.S. Published Patent Application No. 2011/0278093 to La Rock discloses a ladder stabilizing device. The device includes an arm that engages with the hitch receiver of a vehicle. The arm includes a bracket or hand pivotally secured thereon. The hand includes a lateral member for stabilizing a ladder, wherein the lateral member includes a pair of extensions that limit lateral movement of the ladder. Thus, La Rock fails to disclose a ladder stabilizing device having a pair of support arms for securing a ladder in an upright, angled position.

U.S. Pat. No. 7,168,521 to Murray discloses a tree stand ladder hitch assembly. The device includes a ladder assembly having a base member, a top section, and a platform on the top section. The device includes a hitch to be secured to the hitch receiver of a vehicle. The ladder assembly can be collapsed for storage. Thus, while Murray discloses a ladder assembly securable to a hitch of a vehicle, Murray does not disclose a ladder support device for use with a conventional ladder.

U.S. Published Patent Application No. 2012/0199416 to Hopkins et al. discloses a ladder stabilizer. The ladder stabilizer includes a base plate that can hold the lower portion of a ladder, and further having a tire receiving portion thereon. A vehicle can be positioned on the base plate with a wheel in the tire receiving portion to stabilize the base plate. The base plate includes a leg retainer for holding the ladder. Thus, Hopkins fails to disclose a ladder support device removably securable to the hitch of a vehicle, and does not disclose a ladder support device having a pair of support arms.

Finally, U.S. Pat. No. 8,047,331 to Spicer discloses a ladder attachment for the hitch receiver of a vehicle. The attachment can be used to support a ladder and includes a frame that is connectable to a vehicle hitch. The frame includes crosspieces to receive the rungs of the ladder. Fasteners are provided for securing the rungs. Thus, Spicer fails to disclose a ladder support device having an adjustable frame, and having a pair of support arms securable to the ladder to retain the ladder in a desired position.

These prior art devices have several known drawbacks. These devices generally relate to ladder supports attachable to a vehicle hitch. However, such devices do not provide support arms for securing the ladder in an upright, angled position. Further, the devices do not provide a pivoting frame that allows the ladder to be easily moved into a desired location for use.

In light of the devices disclosed in the prior art, it is submitted that the present invention substantially diverges in design elements from the prior art and consequently it is clear that there is a need in the art for an improvement to existing ladder supporting devices. In this regard the instant invention substantially fulfills these needs.

SUMMARY OF THE INVENTION

In view of the foregoing disadvantages inherent in the known types of vehicle hitch mounted ladder support devices now present in the prior art, the present invention provides a new vehicle hitch mounted ladder support device wherein the same can be utilized for providing convenience for the user when securing an extension ladder in an angled position without requiring the ladder to be rested against a support surface, such as the side of a building.

It is therefore an object of the present invention to provide a new and improved vehicle hitch mounted ladder support device that has all of the advantages of the prior art and none of the disadvantages.

It is another object of the present invention to provide a vehicle hitch mounted ladder support device removably securable to the hitch receiver of a vehicle.

Another object of the present invention is to provide a vehicle hitch mounted ladder support device comprising a pivoting frame that allows the user to adjust the positioning of the ladder when secured to the frame.

Yet another object of the present invention is to provide a vehicle hitch mounted ladder support device having brackets for securing the feet of the ladder thereon, and further including support arms for securing the ladder in an angled position.

Another object of the present invention is to provide a vehicle hitch mounted ladder support device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
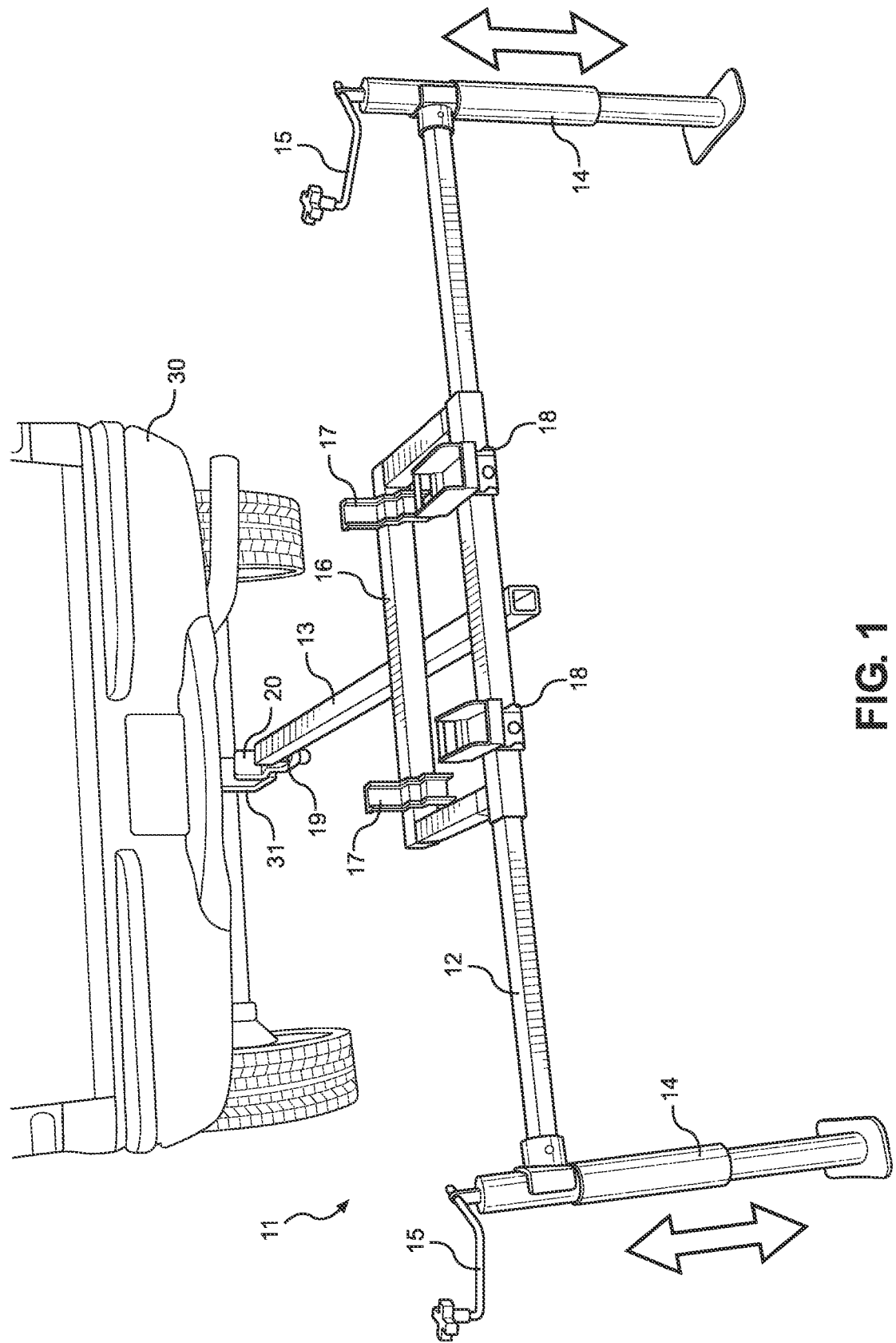
FIG. 1 shows a perspective view of the vehicle hitch mounted ladder support device as secured to a vehicle.

Reference is made herein to the attached drawings. Like reference numerals are used throughout the drawings to depict like or similar elements of the vehicle hitch mounted ladder support device. For the purposes of presenting a brief and clear description of the present invention, the preferred embodiment will be discussed as used for supporting an extension ladder on a device securable to the rear of a vehicle without the need to rest the ladder against a support surface. The figures are intended for representative purposes only and should not be considered to be limiting in any respect.

Referring now to FIG. 1, there is shown a perspective view of the vehicle hitch mounted ladder support device as secured to a vehicle. The ladder support device 11 comprises a frame pivotally securable to the hitch receiver 31 of a vehicle 30. The frame comprises a pivoting rod 13 having a joint 19 on an end thereof, wherein a hitch tongue 20 is disposed on the joint 19. Thus, the hitch tongue 20 can be removably engaged with the hitch receiver 31 of the vehicle 30 so as to secure the frame to a vehicle. With the hitch tongue 20 secured to the hitch receiver 31, the pivoting rod 13 can rotate about the joint 19 so that the pivoting rod 13 can be disposed at a variety of angles relative to the hitch tongue 31. This prevents the user from needing to move the vehicle in order to reposition the ladder situated on the frame.

The frame can be supported solely by means of the engagement of the hitch receiver 31 and hitch tongue 20, but may optionally include a pair of ground engaging legs 14 for additional stability and support. In such embodiments, the frame includes a first crossbar 12 mounted on an end of the pivoting rod 13 such that it is perpendicular thereto, forming a T-shape. Each end of the first crossbar 12 includes a ground engaging leg 14 thereon. Preferably, the ground engaging legs 14 are adjustable in height. In this way, the user can adjust the height of the legs 14 to accommodate uneven surfaces so that the ladder supported on the frame will still be level. The legs 14 are telescopic so that the legs can be extended and retracted. The legs 14 include an adjustment mechanism 15 thereon for adjusting the height of the legs 14 and locking the legs at a desired height. The adjustment mechanism 15 may comprise a rotatable crank.

The frame further includes a pair of ladder support brackets 18 on an upper portion thereof for supporting the feet of a ladder. The brackets 18 are preferably arranged adjacent to one another on the first crossbar 12. The brackets 18 may be movable along the first crossbar 12 so as to accommodate ladders of different sizes and configurations. The brackets 18 include locking members thereon for securing the feet of the ladder therein so that the ladder does not move while in use. The frame additionally includes a pair of support arm brackets 17 thereon. In the illustrated embodiment, the support arm brackets 17 are disposed on a second crossbar 16 disposed perpendicularly to the pivoting arm 13 and parallel to the first crossbar 12. The support arm brackets 17 are positioned adjacent to the ladder support brackets 18 and are aligned therewith.

Figure 3:
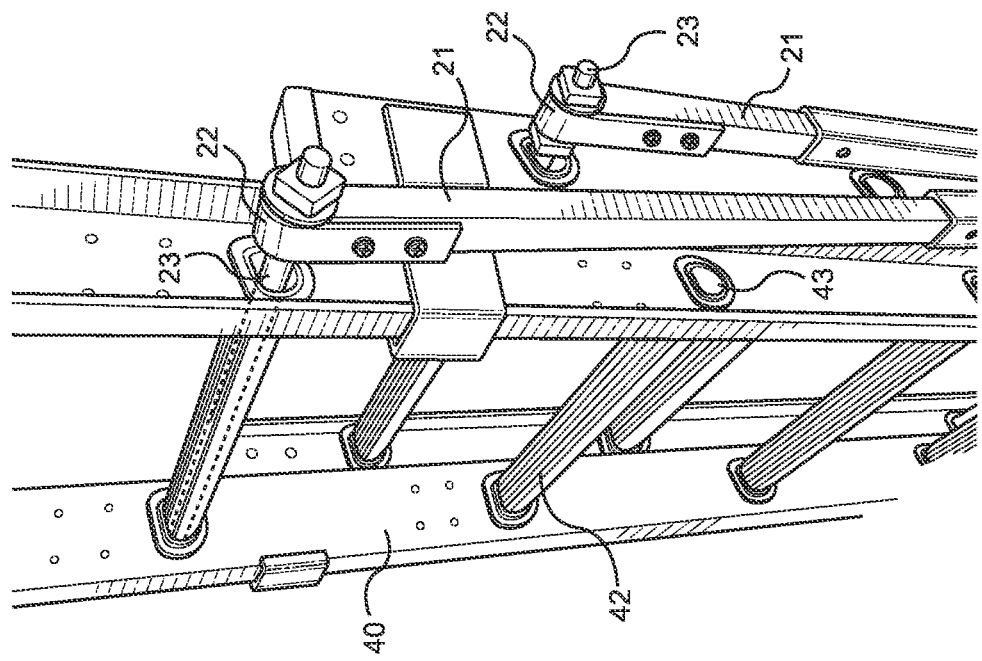
FIG. 3 shows a close-up view of the support arms of the present invention secured to a ladder.
Figure 2:
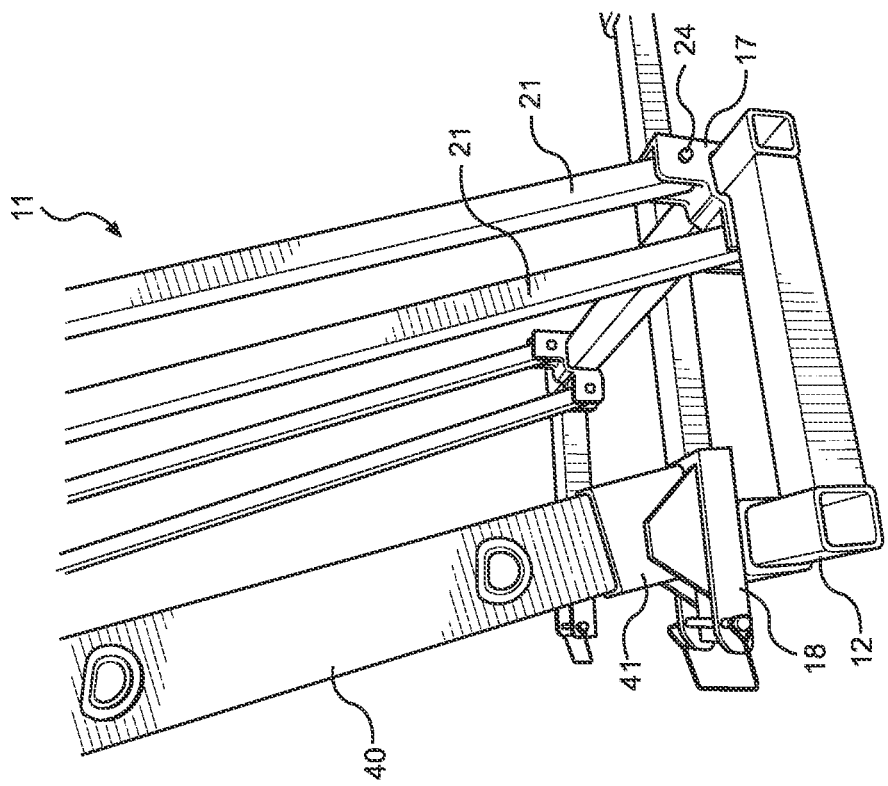
FIG. 2 shows a close-up view of the ladder support device having a ladder supported thereon.

Referring now to FIGS. 2 and 3, there is shown a close-up view of the ladder support device having a ladder supported thereon, and a close-up view of the support arms of the present invention secured to a ladder, respectively. In operation, the feet 41 of a ladder 40 can be positioned in the ladder support brackets 18 on the first crossbar 12. The brackets 18 are dimensioned so as to receive the feet 41 of the ladder 40 therein. The brackets 18 may include a locking member, such as a clamp, for further securing the feet 41 within the bracket 18 so that the ladder 40 does not move while in use.

Each support arm bracket 17 includes one or more support arms 21 pivotally secured thereto. The support arms 21 comprise elongated rods having a lower end and an upper end. Preferably, the support arms 21 are telescopic and include two or more sections so that the support arms 21 can be adjusted to a desired length and secured at the desired length. A first support arm bracket 17 comprises one support arm 21 of a pair of support arms, and a second support arm bracket 17 comprises the second support arm 21 of the pair. The lower end of each support arm 21 is pivotally secured to said support arm bracket 17 by means of a hinge 24. In this way, the support arms 21 can be oriented at various angles so as to support the ladder 40 at various angles as desired by the user. The upper end 22 of each support arm 21 includes a fastening means for securement to a portion of a ladder 40. Preferably, the fastening means includes a securement rod 23 insertable through an opening on the upper end 22 of each support arm 21 and insertable through the hollow interior of a ladder rung 42 for securing the support arms 21 to the ladder 40.

The support arms 21 are arranged such that a support arm 21 is positioned on each side of the ladder 40. The upper ends 22 of the support arms 21 include openings thereon adapted to be aligned with one of the openings 43 on a rung 42 of the ladder 40. Each rung 42 comprises a hollow interior and is open at each end. Thus, a securement rod 23 can be inserted through the openings on a first support arm 21 positioned on one side of the ladder 40, through the hollow interior of the rung 42, and through an opening on a second support arm 21 positioned on the opposite side of the ladder 40. The securement rod 23 can then be secured to both the ladder 40 and the pair of support arms 21 by means of any suitable fasteners, such as nuts or the like. In this way, the support arms are secured to a portion of a ladder 40. Preferably, a first pair of support arms is secured to a first section of the extension ladder, and a second pair of support arms is secured to a second section of the extension ladder. The engagement of the support arms 21 with various portions of the extension ladder 40 serves to secure the ladder in a desired position so that the ladder is supported for use by a user without having to rest the ladder against a support surface.

Figure 4:
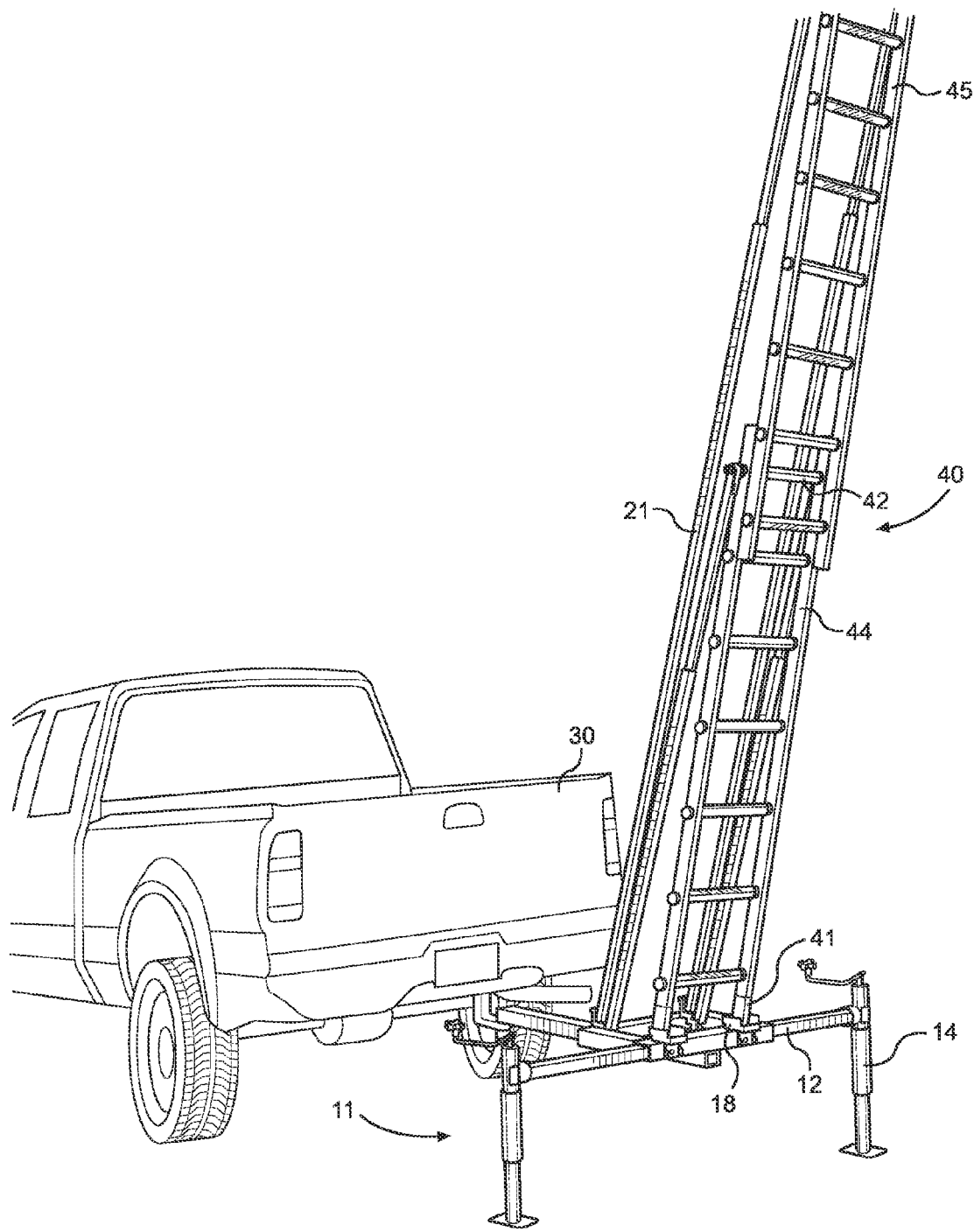
FIG. 4 shows a perspective view of the ladder support device of the present invention as secured to a vehicle.

Referring now to FIG. 4, there is shown a perspective view of the ladder support device of the present invention as secured to a vehicle. In operation, the frame of the device 11 can be removably secured to a vehicle 30 by engaging the hitch tongue to the vehicle's hitch receiver. The pivoting arm allows the frame to be disposed at any of a variety of angles relative to the hitch tongue, so that the frame can be placed in a desired position. The ground engaging legs 14 can be adjusted to the appropriate height such that each leg contacts the ground and provides support and stability to the frame.

The feet 41 of a ladder 40 can be positioned in the ladder support brackets 18 on the first crossbar 12 of the frame, and locking members can be secured so as to hold the ladder feet 41 in place thereon. One or more pairs of support arms 21 can be connected to the ladder 40 by extending the support arms 21 to a desired height, and threading a securement rod through a ladder rung 42 and through the support arms 21 on opposing sides of the ladder 40. Preferably, a first pair of support arms 21 is secured to the first section 44 of the ladder 40, and a second pair of support arms is secured to a second section 45 of the ladder 40. Once extended to the desired length, the support arms 21 can be secured in position so that the length remains constant. In this way, the ladder 40 is securely held by the present invention in an upright, angled orientation so that a user can mount and use the ladder 40 without the need for an additional support surface.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle hitch mounted ladder support device, comprising:
    a frame having a hitch tongue removably securable to a hitch receiver of a vehicle;
    a pair of ladder support brackets disposed on said frame and adapted to removably secure the feet of a ladder therein;
    one or more pairs of support arms pivotally connected to said frame, wherein said one or more pairs of support arms is removably securable to opposing sides of said ladder;
    said one or more pairs of support arms pivotally secured to said frame at a lower end thereof, and removably securable to a portion of said ladder at an upper end thereof;
    wherein the one or more pairs of support arms is telescopic;
    the one or more pairs of support arms comprising a first pair of support arms securable to a first section of the ladder and a second pair of support arms securable to a second section of the ladder.

2. The vehicle hitch mounted ladder support device of claim 1, further comprising a pair of ground engaging legs disposed on said frame.

3. The vehicle hitch mounted ladder support device of claim 2, wherein said pair of ground engaging legs are telescopic.

4. The vehicle hitch mounted ladder support device of claim 2, wherein said pair of ground engaging legs can be adjusted independently of one another.

5. The vehicle hitch mounted ladder support device of claim 2, further comprising at least one rotatable crank for adjusting each of said pair of ground engaging legs.

6. The vehicle hitch mounted ladder support device of claim 1, wherein said hitch tongue is pivotally secured to said frame such that said frame can pivot relative to said hitch tongue in a horizontal plane.

7. The vehicle hitch mounted ladder support device of claim 1, further comprising a securement rod adapted to be inserted through a rung of said ladder and connected to a first pair of support arms.

8. The vehicle hitch mounted ladder support device of claim 1, wherein said frame comprises a T-shape.

9. A vehicle hitch mounted ladder support device, comprising:
    a T-shaped frame having a hitch tongue removably securable to a hitch receiver of a vehicle, wherein said frame comprises a pivoting rod and a first crossbar disposed perpendicularly on an end thereof;
    a pair of ladder support brackets disposed on said crossbar and adapted to secure the feet of a ladder therein;
    one or more pairs of support arms pivotally connected to said frame, wherein said one or more pairs of support arms is positioned on opposing sides of said ladder;
    said one or more pairs of support arms pivotally secured to same frame at a lower end, and removably securable to a portion of said ladder at an upper end thereof by means of a fastener thereon;
    wherein the one or more pairs of support arms is telescopic;

a securement rod adapted to be inserted through a rung of the ladder and connected to a first pair of the one or more pairs of support arms.

10. The vehicle hitch mounted ladder support device of claim 1, further comprising a third pair of support arms securable to a portion of said ladder.

11. A vehicle hitch mounted ladder support device, comprising:
- a frame having a hitch tongue removably securable to a hitch receiver of a vehicle;
- a pair of ladder support brackets disposed on the frame and adapted to removably secure the feet of a ladder therein;
- one or more pairs of support arms pivotally connected to the frame, wherein the one or more pairs of support arms is removably securable to opposing sides of the ladder;
- the one or more pairs of support arms pivotally secured to the frame at a lower end thereof, and removably securable to a portion of the ladder at an upper end thereof;
- wherein the one or more pairs of support arms is telescopic;
- a securement rod adapted to be inserted through a rung of the ladder and connected to a first pair of support arms.

12. The vehicle hitch mounted ladder support device of claim 11, further comprising a pair of ground engaging legs disposed on the frame.

13. The vehicle hitch mounted ladder support device of claim 12, wherein the pair of ground engaging legs are telescopic.

14. The vehicle hitch mounted ladder support device of claim 12, wherein the pair of ground engaging legs can be adjusted independently of one another.

15. The vehicle hitch mounted ladder support device of claim 12, further comprising at least one rotatable crank for adjusting each of the pair of ground engaging legs.

16. The vehicle hitch mounted ladder support device of claim 11, wherein the hitch tongue is pivotally secured to the frame such that the frame can pivot relative to the hitch tongue in a horizontal plane.

17. The vehicle hitch mounted ladder support device of claim 11, wherein the one or more pairs of support arms comprise a first pair of support arms securable to a first section of the ladder and a second pair of support arms securable to a second section of the ladder.

18. The vehicle hitch mounted ladder support device of claim 17, further comprising a third pair of support arms securable to a portion of said ladder.

19. The vehicle hitch mounted ladder support device of claim 11, wherein said frame comprises a T-shape.

* * * * *